United States Patent [19]

Steinberger

[11] E Patent Number: Re. 31,722

[45] Reissued Date of Patent: Nov. 6, 1984

[54] STRINGED MUSICAL INSTRUMENTS

[76] Inventor: Ned Steinberger, 106 Seventh Ave., Brooklyn, N.Y. 11215

[21] Appl. No.: 357,065

[22] Filed: Mar. 11, 1982

Related U.S. Patent Documents

Reissue of:

[64] Patent No.: 4,192,213
Issued: Mar. 11, 1980
Appl. No.: 942,937
Filed: Sep. 18, 1978

[51] Int. Cl.[3] ..... G10G 5/00

[52] U.S. Cl. ..... 84/327; 224/910

[58] Field of Search ..... 84/263–268, 84/280–281, 327, 1.16, 290, 328; 224/265, 271, 910

[56] References Cited

U.S. PATENT DOCUMENTS

| | | | |
|---|---|---|---|
| 774,750 | 11/1904 | Gladieux | 84/273 |
| 1,285,802 | 11/1918 | Russell | 84/327 |
| 1,802,236 | 4/1931 | Carroll et al. | 84/327 |
| 1,945,162 | 1/1934 | Rasmussen | 84/327 |
| 2,208,824 | 7/1940 | Weinberg | 84/280 |
| 2,497,116 | 2/1950 | Dopyera | 84/293 |
| 2,510,799 | 6/1950 | Carley | 84/327 |
| 2,746,336 | 5/1956 | Bisharat | 84/280 |
| 2,884,828 | 5/1959 | Montenare | 84/327 |
| 2,956,467 | 10/1960 | Toop | 84/267 |
| 3,102,446 | 9/1963 | Raleigh | 224/910 |
| 3,366,293 | 1/1968 | Fyke | 84/327 X |
| 3,407,696 | 10/1968 | Smith et al. | 84/297 R |
| 3,512,443 | 5/1970 | Parson et al. | 84/327 |
| 3,955,461 | 5/1976 | Ivie | 84/327 |
| 4,084,476 | 4/1978 | Rickard | 84/293 |
| 4,145,948 | 3/1979 | Turner | 84/293 |
| 4,339,981 | 7/1982 | Smith | 84/291 |
| 4,343,217 | 8/1982 | Brody | 84/1.16 |

*Primary Examiner*—Lawrence R. Franklin
*Attorney, Agent, or Firm*—Finnegan, Henderson, Farabow, Garrett and Dunner

[57] ABSTRACT

A stringed musical instrument such as an electric guitar or an electric bass guitar is balanced to render the instant comfortable to play, supported by a support plate at its center of gravity. The tuning machines are on the body for the purpose of balance. The neck should be of proper weight and rigidity to sustain greater tone and brilliance.

23 Claims, 12 Drawing Figures

FIG.6
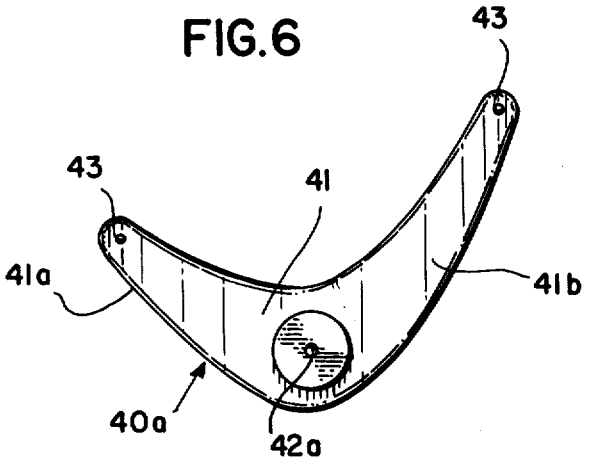
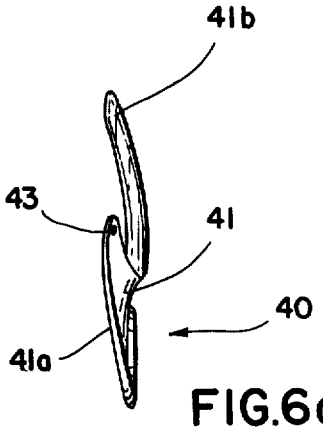
FIG.6a
FIG.7
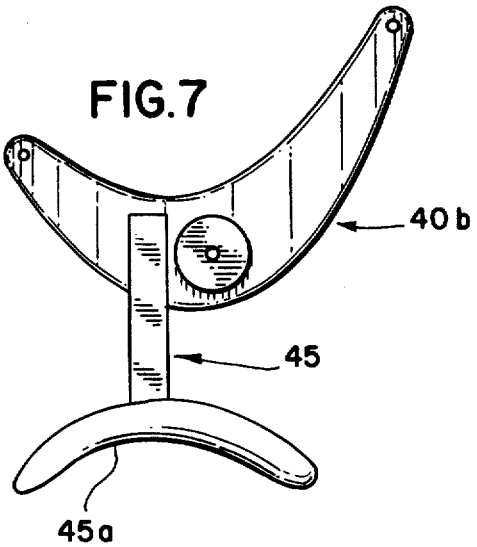
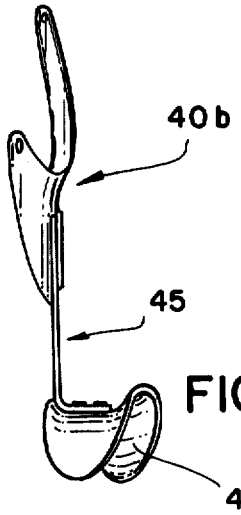
FIG.7a
FIG.8
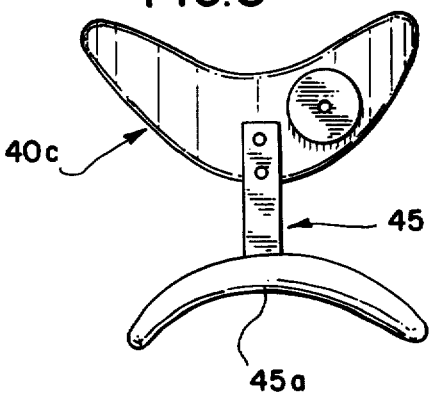
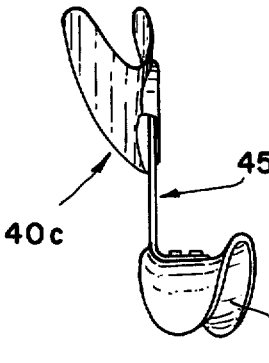
FIG.8a

STRINGED MUSICAL INSTRUMENTS

Matter enclosed in heavy brackets [ ] appears in the original patent but forms no part of this reissue specification; matter printed in italics indicates the additions made by reissue.

*This is an application for reissue of U.S. Pat. No. 4,192,213 issued Mar. 11, 1980 entitled "Stringed Musical Instruments".*

The present invention relates to improvements in stringed musical instruments, and more particularly, to an electric bass guitar having its neck and body in a balanced relationship to each other.

The need for a compact electric guitar-like instrument to substitute for the cumbersome, large, upright acoustical classical string bass was recognized quite early. In 1951, Fender brought out into the marketplace, a solid-bodied, four-stringed guitar with the compass of the acoustic bass, and to which, even though fretted, classical bass guitar players could easily adapt themselves. This instrument became the forerunner of a large family of similar types, sometimes simply called bass guitars.

Electric basses are usually provided with at least one pick up. They can be distinguished not only by their four rather than their six strings, but by the length of the strings, which are 30–34 inches, as compared with about 25 inches in the normal six-stringed guitar. Electric basses are usually classified according to their physical construction. The conventional solid-bodied construction is the most commonly used, because it is made from a flat slab of solid wood or lamination.

A difficulty in the prior art in a conventional guitar, is the conflict between two important aspects, good balance and good tone. Superior balance with the conventional body-neck-peghead arrangement can only be achieved with a relatively light, and therefore flexible neck. Superior sound quality can only be achieved with a relatively heavy and stiff neck.

This problem has been met in the past by manufacturers to achieve superior sound by using relatively heavy aluminum necks. Such instruments are overweight and neck heavy. Instruments of the past with acceptable balance and weight invariably have had limited sustain and brilliance of tone.

The playing of a heavy musical instrument or an instrument with a heavy neck and poor balance, is an unpleasant experience because of the tension, fatigue and strength which is put on the body of the player, particularly after playing for long periods of time.

These shortcomings, due to the heaviness of the neck and peghead in relation to the body, creates an unbalanced musical instrument, uncomfortable to play with and difficult to manage properly.

On the other hand, in studying the behavior of a vibrating system such as a vibrating string, it has been found that when the string vibrates between two fixed end points, it tends to shake and make them move. When the end points move due to the vibration, they take energy from the strings, reducing the sustain and muting the tone.

Therefore, in order to increase sustain (length of tone) and brilliance of tone, it is necessary to have as much weight as possible at the ends of the strings (close to the bridge and in the neck). The end of the string is effectively at the bridge and at the fret being played.

Therefore, the entire neck is important. It is important to make the instrument as rigid as possible, strong and stiff, whereby the neck cannot vibrate independently of the body. I found that by increasing the stiffness of the neck as well as its weight within very close limits, sustain and brilliance of the vibrating string is increased, whereby the quality of the tones is greatly improved.

Additionally, the rigidity or stiffness of the neck may be greatly increased by choosing a material which has a high modulus of elasticity. I also found that an ideal material for the construction of the neck is a polymer reinforced material such as carbon fiber bonded with epoxy, because of its moderate weight and high modulus of elasticity.

It is a well-known fact that an unbalanced musical instrument creates unnecessary strain in the neck and shoulders of the player because the player [inadvertantly] *inadvertently* holds the instrument in an awkward position. I have also found that this problem has been eliminated by having the center of gravity located close to the fingerboard at the lower end thereof, on a 24-fret guitar. Generally, the center of gravity should be located near the 24th fret.

The advantage of having the center of gravity at the end of the fingerboard is that the neck does not have to be supported any more and hangs free on a support in a stable equilibrium with the body and the other parts of the instrument.

According to the present invention, sustain and brilliance of tone are achieved in a stringed musical instrument by providing a fulcrum and convenient support means located at the center of gravity of the instrument where the neck is highly rigid and balanced by the tuning machines being on the body, thus, overcoming the difficulties of the prior art in an instrument comfortable to play.

It is an object of my invention to provide an electric bass guitar which has its center of gravity close to the lower end of the fingerboard on a 24-fret guitar.

It is another object of my invention to provide an electric bass guitar which provides a high quality and proper base tone.

A further object of the present invention is to provide a stringed musical instrument such as an electric bass guitar wherein the weight of the body, tuning machines, bridge and pick-up elements are balanced with the weight of the neck about a fulcrum located at the center of gravity of the instrument in such a way that rotation thereof about this pivot point can be accomplished without substantial effort on the part of the player for selectively adjusting the angle of the neck in relation to his hands and body.

The teachings of the present invention provide an electric bass guitar including a neck, preferably made of a reinforced polymer material such as carbon fiber bonded with epoxy. This composite material has a desirable high modulus of elasticity and good density. The excellent physical properties of carbon fiber composites make them a suitable material for the construction of a guitar neck.

Although such novel feature or features believed to be characteristic of the invention are pointed out in the claims, the invention and the manner in which it may be carried out may be further understood by reference to the description following and the accompanying drawings.

FIGS. 6 through 8a represent top plan views and side views, respectively, of the supporting plates, showing different configurations thereof.

Referring now to the figures in greater detail, where like reference numbers denote like parts in the various figures.

Figures 1, 2, 3, 4, 5:
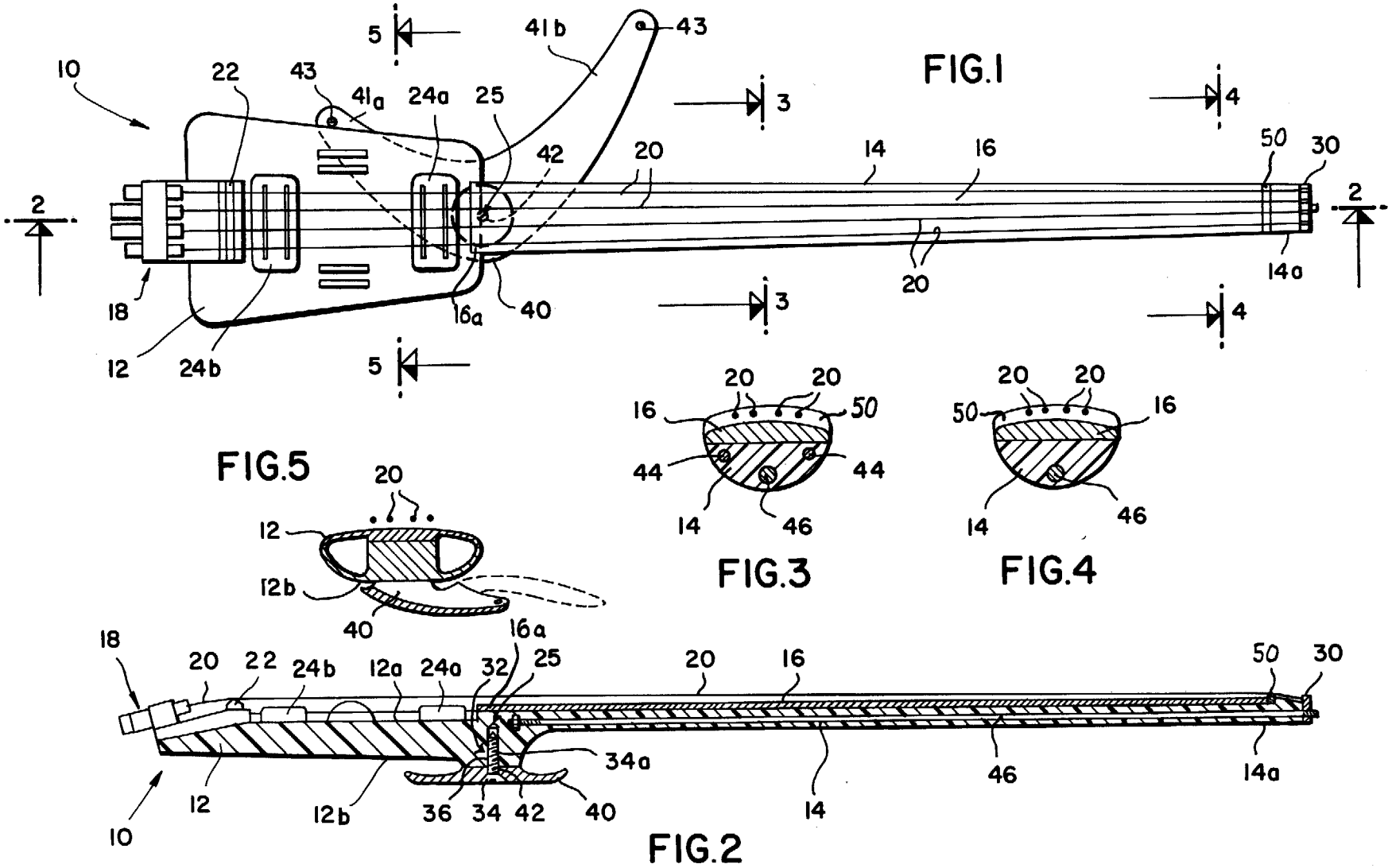
FIG. 1 is a top plan view of my stringed instrument according to the present invention.
FIG. 2 is a sectional view of the present musical instrument taken substantially along the line 2—2 of FIG. 1 and looking in the direction of the arrows.
FIG. 3 represents a cross section of the guitar neck according to the present invention, showing the arrangement of the steel reinforcement bars in spaced relationship to a truss rod embedded into the neck, in accordance with the present invention.
FIG. 4 illustrates a similar view as shown in FIG. 3, taken along the line 4—4 of FIG. 1.
FIG. 5 shows a cross-sectional view taken along the line 5—5 of FIG. 1 and looking in the direction of the arrows.

The body portion 12 includes an elongated slightly tapered neck portion 14 at one end thereof, extending longitudinally outwardly therefrom and having a fingerboard 16 mounted thereon; tuning machines 18 are arranged at the other end of the body 12 and confronting substantially the neck portion 14.

A plurality of playing strings 20 are extended, spaced apart in relationship to each other, along the body portion 12 and neck portion 14.

It will be clearly understood that the number of strings arranged along the neck and body portions depend on the type of musical instrument to be constructed, such as an electric bass guitar (four strings) or an electric guitar (six strings). Since the preferred embodiment according to the present invention is directed to an electric bass guitar, four strings 20 have been illustrated as seen more clearly in FIG. 1.

The present stringed musical instrument 10 further includes a bridge 22 mounted across the top of a step-down surface 12a of body portion 12, as shown in FIG. 2 in a direction transverse to the longitudinal axis of the neck portion 14 close too the tuning machines 18.

Referring again to FIGS. 1 and 2, I [preferred] *prefer* to provide two separate pick-ups 24a–24b for a variety of tones. The pick-up 24a is located with the bass or mellow, close to the fingerboard 16 and the [bright on] treble, *or bright,* near pick-up 24b, close to the bridge 22.

A very important feature of the present invention shown in FIG. 2 is the particular location of the center of gravity of the instrument 10. Specifically, the center of gravity 25 is located adjacent the end of 16a of fingerboard 16, on a 24-fret guitar. The center of gravity should be located quite near the 24th fret.

Conventional tuning keys or tuning machines 18 may be mounted in a well-known manner to those skilled in the art and will therefore not be discussed in detail. One end of the string 20 is adjustably secured thereto while the opposite fixed end is conveniently mounted on a retainer plate 30 located at the free end 14a of the neck portion 14.

Another important feature of the present invention shown in FIG. 2 is the particular location of a fulcrum 32 relative to the body portion 12 and neck portion 14. Specifically, the fulcrum 32 is located at the center of gravity of the instrument 10, and comprises a mounting bolt 34 having a threaded end portion 34a. The mounting bolt 34 is mounted beneath the bottom surface 12b of body portion 12 wherein a threaded opening 36 is provided and being adapted to receive the threaded portion 34a of bolt 34.

A supporting plate 40 is pivotally mounted beneath body portion 12 of the instrument 10 including a bore 42 therethrough for receiving the bolt 34 extending through bore 42 and projecting into the opening 36 so that the musical instrument can be easily rotated about fulcrum 32 when the player wishes to selectively adjust the angle of the neck portion 14.

I have found that an ideal weight for the neck of the instrument including the fingerboard according to the present invention is about 2.5 to 3.5 pounds in order to get a well-balanced instrument and also it has a cross section (not including the fingerboard) averaging 1¼ inches, about 23 to 26 inches long, giving it a volume of approximately 29 to 32 cubic inches.

Below shown in a table is a list of actual densities of different materials used in the construction of a guitar neck and relating these figures to the volume of the neck, giving the weight of the neck in each material. All figures are approximate and are intended primarily to show basic relationships.

| | Density | Weight Neck |
|---|---|---|
| Wood | ½ oz/in 3 | 1 lb. |
| Carbon fiber and epoxy | 1 oz/in 3 | 2 lb. |
| Aluminum | 2 oz/in 3 | 4 lb. |
| Glass fiber and epoxy | 1½ oz/in 3 | 2–3 lb. |
| Steel | 5 oz/in 3 | 10 lb. |

Referring to FIG. 3, steel reinforcement bars or wires 44 may be axially arranged in a parallel spaced apart relationship along the entire length of neck portion 14 to increase to rigidity of the neck as well as its weight to obtain a proper balanced musical instrument.

As seen clearly in FIG. 2, there is optionally provided a conventional truss rod 46 embedded into neck portion 14. The function of the truss rod 46 is well known to those skilled in the art and will therefore not be discussed in further detail.

The configuration of the supporting plate 40 as shown in the figures is such that the musical instrument 10 can be played in several positions depending upon the type of supporting plate 40 attached to the body of the instrument.

Thus, for instance, plate 40a shown in FIGS. 6 and 6a is used when playing the musical instrument from a standing position only and comprises a body 41 having a boomerang-like configuration. The body 41 includes a small arm 41a and a long arm 41b extending outwardly therefrom in a spaced-apart relationship. The free ends of the arms 41a–41b are provided with convenient strap holes 43 adapted to receive the ends of a strap to hold the musical instrument around the neck of the player. The body 41 further includes a mounting hole 42a therethrough for receiving the mounting bolt 34.

The supporting plate 40b as shown in FIGS. 7 and 7a has a similar configuration as the plate 40a. However, plate 40b further includes a snap-on leg rest member 45, having a concave surface 45a adapted to be used on the legs of the player when playing the instrument in a sitting position. Also, it is noteworthy that the plate 40b may be used when playing the instrument from a standing position.

Referring to FIGS. 8 and 8a, there is illustrated a supporting plate 40c, somewhat similar to the configuration of plate 40b. The plate 40c does not include any strap holes. The leg rest member 45 is permanently attached to the plate 40c, thus the plate is used exclusively when playing the instrument from a sitting position.

Although I have found that a carbon fiber-epoxy is a most suitable material for a guitar neck, there are other materials such as glass fiber epoxy, aluminum and steel reinforced wood, which may be used in construction of the guitar neck in some circumstances.

Figure 9:
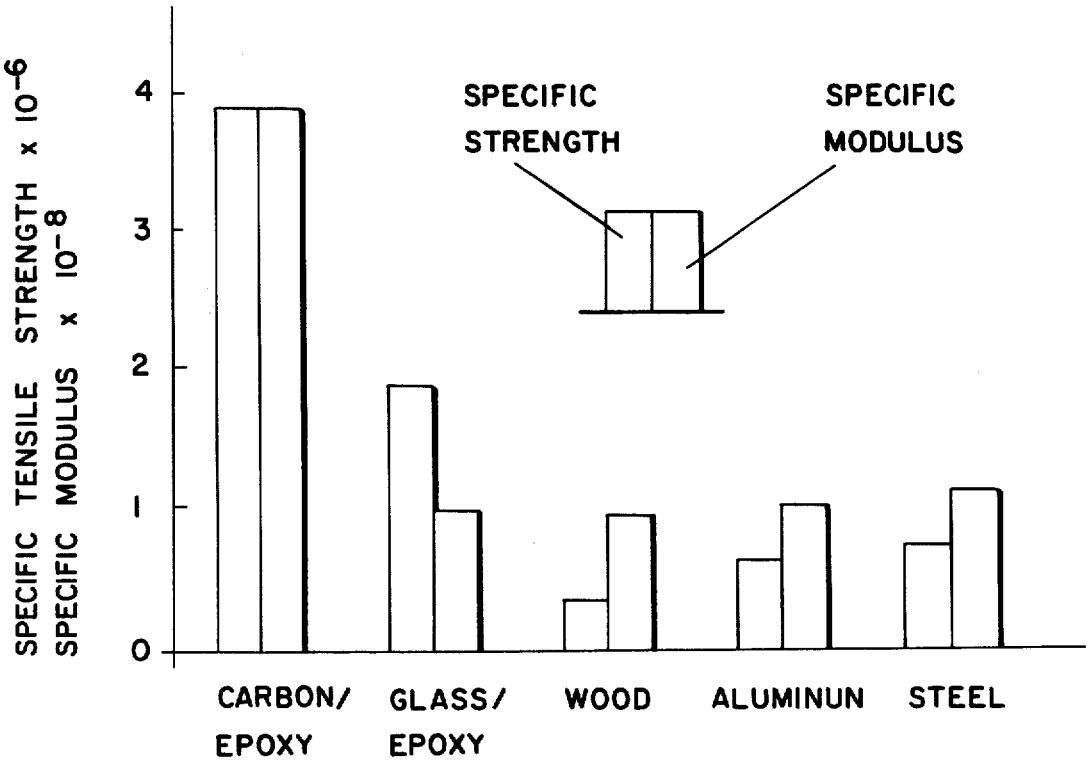
FIG. 9 is a table of comparison of specific strengths and modulus of materials.

I chose a carbon fiber epoxy as my ideal material because its structural benefits such as high stiffness-to-weight ratio and high strength-to-weight ratio as shown in FIG. 9.

Furthermore, the high stiffness-to-weight ratio is a major attribute of a carbon fiber epoxy, and the incorporation of a 34 to 100 million psi modulus fiber in one of several polymer resin systems can result in a material with a stiffness twice that of steel at one-fifth the weight. Most of the carbon fiber composite applications discussed here involve materials with one-third to two thirds the elastic modulus of steel and one-fifth its weight.

Additionally, the high strength-to-weight ratio of carbon fiber epoxy materials can provide strengths exceeding 220,000 psi. Frequently, however, because of design requirements, a composite strength of from 100,000 to 150,000 psi is a more realistic value.

FIG. 9 compares the specific strength and specific elastic modulus for several materials of construction. (Specific values are the ultimate values divided by the density). As shown, a carbon-fiber epoxy has significantly higher values for both specific strength and specific modulus than other common materials. With the carbon-fiber epoxy and glass-fiber epoxy values being higher than those for metals, coupled with the relative economics of the materials, both now and as projected in the future.

I have chosen a carbon-fiber epoxy as preferred, for its functional benefits such as high vibrational dampening within itself and low transmissability of sound. Sound is therefore not remitted or absorbed by the material of the neck, maximizing the vibration and brilliance of sound of the string.

A measure of stiffness for providing desired brilliance and sustain may be had by measuring the deflection of the neck portion 14, by supporting the body 12 [up to] *at* the 24th fret or the center of gravity and hanging a five-pound weight from the nut 50.

Deflection of carbon-fiber epoxy is only 0.06 of an inch. The maximum deflection is preferably no more than 0.09 of an inch. The normal deflection of a normal wooden neck portion 14 is 0.13 of an inch or more.

In achieving the sound and balance of the present invention, stiffening may be provided to the neck portion 14 construction within the weight and cross-sectional parameters for comfort and balance. Thus, for instance, a wooden neck portion 14 may be stiffened with wires 44 within the limits of reasonable weight and average neck cross-section to achieve desired stiffness. Other materials may fall into the parameters of the present invention or may be modifiable or usable in combination.

Steel, for instance, is very rigid, but too heavy. Reinforced wood is in effect using the characteristics of both wood and steel to make the most of both materials within the parameters of the present invention.

The terms and expressions which are employed are used as terms of description; it is [recongnized,] *recognized* though, that various modifications are possible.

It is also understood the following claims are intended to cover all of the generic and specific features of the invention herein described, and all statements of the scope of the invention, which, as a matter of language, might fall therebetween.

Having described certain forms of the invention in some detail, what is claimed is:

1. A stringed musical instrument comprising a body, a neck portion extending from said body, said neck including a nut and a fingerboard, tuning machines, said tuning machines extending from said body portion opposite said neck portion, support means for supporting said instrument, said support means pivotally engaging said instrument, said support means pivoting at the center of gravity of said instrument, and said neck of said instrument weighing approximately no less than 2.5 pounds, said neck having an average cross section without a fingerboard of approximately 1.25 inches, and said neck deflecting no more than 0.09 inches when said instrument is supported [to] *at* its center of gravity and with a five-pound weight depending from said nut of said neck.

2. The invention of claim 1 wherein the musical instrument is an electric bass guitar.

3. The invention of claim 1 or 2 wherein said neck weighs no more than 3.5 pounds.

4. The invention of claim 1 wherein said neck is approximately no less than 23 inches and no more than 26 inches long.

5. The invention of claim 4 wherein said neck is no less than 29 cubic inches and no more than 32 cubic inches.

6. The invention of claims 1, 2 or 4 wherein said center of gravity is near the 24th fret of said instrument.

7. The invention of claim 1 wherein said support means is a plate.

8. The invention of claim 7 wherein said support plate has a boomerang-like configuration.

9. The invention of claim 8 wherein said support plate includes a leg rest.

10. The invention of claim 9 wherein sad leg rest is a snap-on leg rest.

11. The invention of claim 9 wherein said leg rest is concave.

12. The invention of claim 8 wherein said support plate includes means to join it with support straps.

*13. A stringed musical instrument comprising a body having a bottom surface, a neck portion extending from said body and including a fingerboard, means for tuning said instrument, and support means for supporting said instrument, said support means pivotally attached to the bottom surface of the body of said instrument only substantially at the center of gravity of said instrument.*

*14. A support member for facilitating the resting of a stringed musical instrument on a human body, the instrument including a body having a bottom surface, said support member comprising:*

*a support plate pivotally attached to the bottom surface of the instrument only substantially at the center of gravity of said instrument.*

*15. An auxiliary support member for facilitating the resting of a stringed musical instrument on a leg of a human body, the instrument including a body, a neck*

*portion extending from said body and including a fingerboard, and means for tuning said instrument, the support member comprising:*

*a leg rest member for supporting said instrument from below on the leg of a seated musician, said leg rest member being attached to the body of said instrument only substantially at the center of gravity of said instrument, whereby said instrument is substantially in balance when said leg rest is resting on the leg of said seated musician.*

*16. The instrument of claim 15 wherein said leg rest member is pivotally attached, and has a concave surface thereon.*

*17. The auxiliary support member of claim 15 wherein said leg rest member is attached to said instrument by a snap-in action.*

*18. A stringed musical instrument comprising a body, a neck portion extending from said body, said neck including a nut and a fingerboard, tuning means mounted on said body opposite said neck portion, and support means pivoted to said body only substantially at the center of gravity of said instrument for resting said instrument against the body of a musician.*

*19. The instrument of claim 18 wherein said support means includes a plate having fastening means at spaced apart locations thereon, and a strap, the opposite ends of said strap attaching to said fastening means for holding said instrument around the neck of a musician.*

*20. The instrument of claim 19 wherein said plate has a boomerang-like configuration, and said fastening means includes a pair of strap holes at the opposite ends of said boomerang-like plate.*

*21. The instrument of claim 18 wherein said center of gravity is located substantially at the point where said neck joins said body.*

*22. The instrument of claim 21 wherein said instrument has 24 frets, and said 24th fret falls substantially at said center gravity.*

*23. A stringed musical instrument comprising a body having a bottom surface, a neck portion extending from said body and including a fingerboard, means for tuning said instrument, means for attachment located substantially at the center of gravity of said instrument, and support means for supporting said instrument, said support means pivotally attached to said means for attachment on the bottom surface of the body of said instrument only substantially at the center of gravity of said instrument.*

* * * * *